Patented May 24, 1938

2,118,713

UNITED STATES PATENT OFFICE 2,118,713

MANUFACTURE OF NITROGEN CONTAINING DERIVATIVES OF POLYMERIZED VINYL ESTERS OF HALOGEN FATTY ACIDS

Herbert Rein, Leipzig, Germany, assignor to I. G. Farbenindustrie Aktiengesellschaft, Frankfort-on-the-Main, Germany No Drawing. Application August 1, 1935, Serial No. 34,298. In Germany August 7, 1934

12 Claims. (Cl. 260—2)

My present invention relates to the manufacture of nitrogen containing derivatives of polymerized vinyl esters of halogen fatty acids.

One of its objects is a process of producing nitrogen containing derivatives of polymerized vinyl esters of halogen fatty acids. Another object are the nitrogen containing derivatives of polymerized vinyl esters of halogen fatty acids. Further objects will be seen from the detailed specification following hereafter.

I have found that nitrogen containing polyvinyl derivatives are obtainable by treating a polymerized vinyl ester of a halogen fatty acid with an organic base in the warmth. As organic bases which enter into consideration I enumerate primary and secondary aliphatic aromatic and hydroaromatic amines; furthermore, tertiary aliphatic aromatic and hydroaromatic amines preferably those which contain at least 1 methyl group; futhermore, pyridine, piperidine and cyclohexylamine. Such amines are for instance, methyl amine, tetramethylethylenediamine, n-dimethyl-2-aminobutane, dimethyldodecylamine and methylbenzylamine. The condensation is performed while using the base alone or with the addition of diluents and/or solvents, for instance, water or acetone. The condensation takes place already at room temperature, however, it is preferably carried out at a temperature of 80 to 120° C. In some cases there may be used a temperature higher than 120° C., however, in general there occurs more or less strong degradation. The products obtained contain about 2 to 7% of nitrogen. The content of nitrogen depends on the magnitude of the molecule of the polymerized vinyl compound and of the organic base. Generally two molecular proportions of polymerized vinyl halogen fatty acid ester (calculated on the unpolymerized product) react with one molecular proportion of base. This proportion is obtained when using a sufficiently high temperature and when continuing the reaction sufficiently long. The products obtained are water soluble, or swellable in water, or insoluble in water. The solubility in water depends on the kind of base introduced in the molecule of the polymerized vinyl compound, and on eventually occurring partial saponification. In the latter case alcohol groups are introduced in the molecule of the polymerized vinyl compound.

The products according to this invention may be used as protective colloids, emulsifying agents, thickening agents, adhesives, textile assistants and the like.

The following examples illustrate the invention:

Example 1.—12 grams of polymeric vinylchloracetate are dissolved with aid of heat in 30 to 50 cc. of pyridine. After heating for about 15 minutes at 100° C., the reaction begins and the solution solidifies to a yellowish-white, solid, radiated mass, which is easily soluble in water. By pulverization and subsequent extraction with carbon tetrachloride or another suitable solvent the mass can be thoroughly freed from excess of pyridine. There is finally produced a white, nearly odourless powder which dissolves gradually when heated with water, while swelling.

Instead of pyridine a homologue of pyridine may be used either alone or together with pyridine.

Example 2.—120 grams of polymeric vinyl chloracetate dissolved in 500 cc. of acetone are slowly mixed with 85 grams of piperidine, if necessary while cooling. The solution solidifies to a fibrous mass. After washing with methyl alcohol the reaction product has a content of nitrogen of 4.34%.

Example 3.—120 grams of polymerized vinyl chloroacetate dissolved in 500 cc. of acetone are reacted upon with 84 grams of piperidine in the manner described in Example 2. The reaction product is washed with carbon tetrachloride and dried at 60° C.

Example 4.—120 grams of polymeric vinyl chloroacetate dissolved in 500 cc. of acetone are reacted upon with 100 grams of cyclohexylamine. The reaction product is washed with carbon tetrachloride and has a content of 8.3 of nitrogen. The yield is 215 grams.

Example 5.—120 grams of polymerized vinyl chloroacetate dissolved in 500 cc. of acetone after interaction with 45 grams of dimethylamine yield a product containing 6.6% of nitrogen.

Example 6.—In a solution of 120 grams of vinyl chloroacetate there are introduced 120 grams of trimethylamine, whereby the solution becomes turbid and soon a crystalline precipitate separates.

Example 7.—120 grams of polymeric vinyl chloroacetate dissolved in 500 cc. of acetone are mixed with 120 grams of tetramethylethylenediamine and allowed to stand for 48 hours. There are obtained 222 grams of a white powder containing 6.75% of nitrogen.

Example 8.—120 grams of polymeric vinylchloroacetate dissolved in 500 cc. of acetone yield when heated with 205 grams of dimethyldodecylamine on the steam-bath to 60° on cooling 290 grams of a wax-like powder containing 3.23 per cent of nitrogen.

*Example 9.*—400 grams of polymeric vinylchloroacetate of which half of its chloroacetyl groups have been split off by saponification with a methyl alcoholic solution of caustic soda, are boiled with 1000 cc. of water and 200 grams of trimethylamine for 12 hours under reflux and precipitated by means of acetone. There results a white powder with a content of nitrogen of 2.3 per cent.

In the examples polymerized vinyl chloroacetate has been used as a starting material inasmuch as this compound is the practically most important. However, the invention is not limited to the use of this compound, but other polymerized vinylesters of chloro-fatty acids with a straight or branched chain of carbon atoms may be used, for instance, lower members such as chloropropionate or higher members such as chlorolaurate or chlorostearate.

What I claim is:

1. A process of introducing nitrogen in a polymerized vinyl ester of a chloroaliphatic acid which comprises treating said polymerized vinylester of a chloroaliphatic acid with an amine selected from the group consisting of primary secondary and tertiary amines.

2. A process of introducing nitrogen in a polymerized vinyl ester of a chloroaliphatic acid which comprises treating said polymerized vinylester of a chloroaliphatic acid with an amine selected from the group consisting of primary secondary and tertiary amines, in the presence of a diluent.

3. A process of introducing nitrogen in a polymerized vinyl ester of a chloroaliphatic acid which comprises treating said polymerized vinylester of a chloroaliphatic acid with an amine selected from the group consisting of primary secondary and tertiary amines in the presence of a solvent.

4. A process of introducing nitrogen in a polymerized vinyl ester of a chloroaliphatic acid which comprises dissolving polymeric vinylchloracetate in pyridine, heating the mixture to 100° C. for about 15 minutes and carrying on the reaction until separation of a solid mass.

5. A process of introducing nitrogen in a polymerized vinyl ester of a chloroaliphatic acid which comprises dissolving polymeric vinylchloracetate in acetone, and interacting this solution with dimethylamine.

6. A process of introducing nitrogen in a polymerized vinyl ester of a chloroaliphatic acid which comprises saponifying vinylchloracetate until half of its chloracetyl groups have been split off, boiling the resulting product with 1000 cc. of water and 200 grams of trimethylamine for 12 hours under reflux, and precipitating the reaction product with aceton.

7. A polyvinylester of a chloroaliphatic acid containing about 2 to 7 per cent of nitrogen bound in amine residues.

8. A process of introducing nitrogen in a polymerized vinylester of a chloro-aliphatic acid which comprises treating said polymerized vinylester of a chloro-aliphatic acid with a tertiary amine containing in its molecule at least one methyl group.

9. A process of introducing nitrogen in a polymerized vinylester of a chloro-aliphatic acid which comprises heating said polymerized vinylester of a chloro-aliphatic acid with an amine selected from the group consisting of primary, secondary and tertiary amines.

10. A process of introducing nitrogen in a polymerized vinylester of a chloro-aliphatic acid which comprises heating said polymerized vinylester of a chloro-aliphatic acid with an amine selected from the group consisting of primary, secondary and tertiary amines in the presence of a diluent.

11. A process of introducing nitrogen in a polymerized vinylester of a chloro-aliphatic acid which comprises heating said polymerized vinylester of a chloro-aliphatic acid with an amine selected from the group consisting of primary, secondary and tertiary amines in the presence of a solvent.

12. A polymerized vinyl-chloracetate containing about 2 to 7% of nitrogen bound in an amine residue.

HERBERT REIN.